(12) United States Patent
Guyot et al.

(10) Patent No.: US 10,073,625 B2
(45) Date of Patent: Sep. 11, 2018

(54) VARIABLE-RPM HARD DISK DRIVE CONTROL

(71) Applicant: HGST Netherlands B.V., Amsterdam (NL)

(72) Inventors: Cyril Guyot, San Jose, CA (US); Mohammed Ghiath Khatib, Santa Clara, CA (US); Adam C. Manzanares, San Jose, CA (US); Lluis Pamies-Juarez, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/989,560

(22) Filed: Jan. 6, 2016

(65) Prior Publication Data
US 2017/0192685 A1    Jul. 6, 2017

(51) Int. Cl.
*G06F 1/32* (2006.01)
*G06F 3/06* (2006.01)
*G11B 19/26* (2006.01)

(52) U.S. Cl.
CPC .......... *G06F 3/0608* (2013.01); *G06F 3/0653* (2013.01); *G06F 3/0689* (2013.01); *G11B 19/26* (2013.01); *G06F 1/3203* (2013.01)

(58) Field of Classification Search
CPC .......................... G06F 1/3203; Y02B 60/1217
USPC ......................................................... 713/320
See application file for complete search history.

(56) References Cited

U.S. PATENT DOCUMENTS

| 6,400,892 | B1 * | 6/2002  | Smith ............... G11B 19/125 386/222 |
| 7,472,298 | B1   | 12/2008 | Kimmel et al. |
| 7,516,348 | B1 * | 4/2009  | Ofer .................... G06F 1/3203 365/28 |
| 7,685,463 | B1 * | 3/2010  | Linnell ............. G06F 11/2094 714/5.1 |

(Continued)

OTHER PUBLICATIONS

Shobana Balakrishnan et al., "Pelican: A Building Block for Exascale Cold Data Storage," dated Oct. 6-8, 2014, 16 pages, 11th USENIX Symposium on Operating Systems Design and Implementation.

(Continued)

*Primary Examiner* — Jaweed A Abbaszadeh
*Assistant Examiner* — Volvick Derose
(74) *Attorney, Agent, or Firm* — Patent Law Works LLP (57) ABSTRACT

The present disclosure relates to a system and methods of controlling a system of storage devices. In particular, the present disclosure relates to methods of controlling peak power and energy consumption in storage systems due to storage devices while maintaining data availability. The system implements a method for maintaining data availability in a storage subsystem by determining a plurality of storage devices to include in a fixed set of storage devices based on a fault tolerance system. The storage devices included in the fixed set are prevented from transitioning between RPM spin modes. The method further involves controlling peak power and energy consumed by the storage subsystem which may include transitioning the storage devices not included in the fixed set from a high RPM operational mode to a low RPM operational mode to reduce peak power and energy consumption.

25 Claims, 8 Drawing Sheets

(56) References Cited

U.S. PATENT DOCUMENTS

| | | | | |
|---|---|---|---|---|
| 8,006,111 B1* | 8/2011 | Faibish | G06F 1/3221 | 711/114 |
| 8,296,513 B1* | 10/2012 | Liu | G06F 1/3268 | 360/69 |
| 8,745,327 B1* | 6/2014 | Throop | G06F 3/0647 | 711/100 |
| 2002/0144057 A1* | 10/2002 | Li | G06F 3/0614 | 711/112 |
| 2005/0204097 A1* | 9/2005 | Kistler | G11B 19/28 | 711/114 |
| 2005/0235109 A1* | 10/2005 | Ogihara | G06F 3/0605 | 711/114 |
| 2006/0036605 A1* | 2/2006 | Powell | G06F 1/3221 | |
| 2006/0069886 A1 | 3/2006 | Tulyani | | |
| 2006/0107099 A1* | 5/2006 | Pinheiro | G06F 1/3221 | 714/6.13 |
| 2009/0112894 A1* | 4/2009 | Idei | G11B 19/02 | |
| 2009/0235097 A1* | 9/2009 | Hamilton | G06F 1/3203 | 713/320 |
| 2010/0238574 A1* | 9/2010 | Balasubramanian | G06F 3/0625 | 360/15 |
| 2010/0287397 A1* | 11/2010 | Naor | G06F 1/3203 | 713/324 |
| 2010/0313044 A1* | 12/2010 | Rajpal | G06F 1/3203 | 713/320 |
| 2010/0313045 A1* | 12/2010 | Olarig | G06F 1/3221 | 713/320 |
| 2011/0035547 A1* | 2/2011 | Kidney | G06F 3/061 | 711/114 |
| 2011/0035565 A1* | 2/2011 | Barrall | G06F 3/0607 | 711/170 |
| 2011/0161582 A1* | 6/2011 | Volobuev | G06F 3/0613 | 711/112 |
| 2011/0264854 A1* | 10/2011 | Ouchi | G06F 1/3268 | 711/114 |
| 2011/0271049 A1* | 11/2011 | Zimoto | G06F 1/3287 | 711/114 |
| 2011/0286130 A1* | 11/2011 | Goldberg | G11B 5/5547 | 360/75 |
| 2012/0011313 A1* | 1/2012 | Kopylovitz | G06F 12/0866 | 711/113 |
| 2012/0023289 A1* | 1/2012 | Anderson | G06F 3/061 | 711/112 |
| 2012/0317354 A1* | 12/2012 | Yokota | G06F 3/0625 | 711/113 |
| 2013/0290598 A1* | 10/2013 | Fiske | G06F 3/0625 | 711/103 |
| 2013/0339635 A1 | 12/2013 | Amit et al. | | |
| 2015/0120995 A1* | 4/2015 | Hasfar | G06F 3/0632 | 711/104 |
| 2016/0216911 A1* | 7/2016 | Ford | G06F 3/0625 | |
| 2016/0239390 A1* | 8/2016 | Myers | G06F 11/1662 | |
| 2016/0246677 A1 | 8/2016 | Sangamkar et al. | | |
| 2016/0328162 A1* | 11/2016 | Hayes | G06F 3/0688 | |
| 2017/0038816 A1* | 2/2017 | Madsen | G06F 1/3206 | |
| 2017/0125051 A1* | 5/2017 | Yang | G11B 19/28 | |

OTHER PUBLICATIONS

Asaf Cidon et al., "Copysets: Reducing the Frequency of Data Loss in Cloud Storage," dated 2013, 12 pages, Stanford University.

* cited by examiner

VARIABLE-RPM HARD DISK DRIVE CONTROL

FIELD OF THE INVENTION

The present disclosure relates to a system and methods of controlling a system of storage devices. In particular, the present disclosure relates to methods of controlling peak power and energy consumption in storage systems due to hard disk drives.

BACKGROUND

Data centers have stringent requirements and constraints with regards to peak power and energy consumption. Peak power capacity is a key factor in determining the cost of building a data center and determining the size of the power conditioning and distribution infrastructure and the cooling systems. Energy consumption is also important as it contributes to the data center's operating expenses. Systems and controls in data centers must accommodate changes in peak power demand as well as quickly and efficiently respond to changes in the demand given constraints. Typical storage systems include hard disk drives having a single speed mode. In such systems, peak power and energy consumption may be reduced by powering off the hard disk drives. However, powering off the hard disk drives causes the data hosted on these hard disk drives to become unavailable for I/O requests. Thus, to reduce capital expenses and running costs, there is a need to design systems and components to reduce both their peak power and energy consumption while maintaining data availability.

SUMMARY

Systems and methods for controlling a system of storage devices are disclosed. The systems and methods introduced herein reduce peak power and energy consumption while ensuring data availability. For example, a system includes one or more processors and a memory storing instructions that cause the one or more processors to determine a first plurality of storage devices in a storage subsystem to include in a fixed set. The number and/or selection of storage devices to include in the fixed set may be determined based on a fault tolerance scheme employed in the storage subsystem. The instructions may cause the one or more processors to prevent the first plurality of storage devices of the fixed set from transitioning between operational modes (i.e., remain in a fixed operational mode) in order to ensure data availability at all times. As an example, a dual-RPM (revolutions per minute) hard disk drive may become temporarily unavailable during periods of transitioning between operational modes. The operational modes of a dual-RPM hard disk drive may include a high RPM spin speed mode and a low RPM spin speed mode. Furthermore, the instructions may cause the one or more processors to allow the remaining storage devices in the storage subsystem to transition between operational modes in order to handle throughput demand and control peak power and/or energy consumption.

Additionally, the instructions may cause the one or more processors to determine an I/O workload of an identified storage device in the storage devices not include in the fixed set. The instructions may further cause the one or more processors to determine whether the I/O workload satisfies a threshold and transition an operational mode of the identified storage device based on the determination that the threshold has been satisfied. For example, in order to reduce peak power and energy consumption, an identified storage device, not included in the fixed set, may be transitioned from a high RPM mode to a low RPM mode. On the other hand, to satisfy periods of increased throughput demands, an identified storage device, not included in the fixed set, may be transitioned from the low RPM mode to the high RPM mode.

Other embodiments of one or more of these aspects include corresponding systems, apparatus, methods, and computer programs, configured to perform the actions of the methods, encoded on computer storage devices. It should be understood that the language used in the present disclosure has been principally selected for readability and instructional purposes, and not to limit the scope of the subject matter disclosed herein.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Systems and methods for controlling a system of storage devices are disclosed. While the systems and methods of the present disclosure are described in the context of a particular system architecture, it should be understood that the systems, methods and interfaces can be applied to other architectures and organizations of hardware.

A system of storage devices may be controlled to minimize peak power and energy consumption in a data center while maintaining data availability. The storage devices in a storage subsystem may include variable-RPM hard disk drives operable at various RPMs including, for example, a low RPM, a high RPM, and various RPMs in between. In some embodiments, dual-RPM disk drives having a low and a high speed spin mode may be used. A control loop may be used to monitor the storage devices and the intensity of the I/O workload on the system. During periods of light workload, the system may be configured to transition as many storage devices as possible to a lower RPM mode to reduce peak power and energy consumption. If the workload's intensity increases, the system may be configured to transition as many storage devices as needed to a higher RPM mode to satisfy throughput demands. The system may be configured to maintain full data availability despite storage devices becoming unavailable during periods when the storage devices transition between RPM speeds. The system may be configured to select certain storage devices to transition while holding others from transitioning to ensure data availability.

Figure 1:
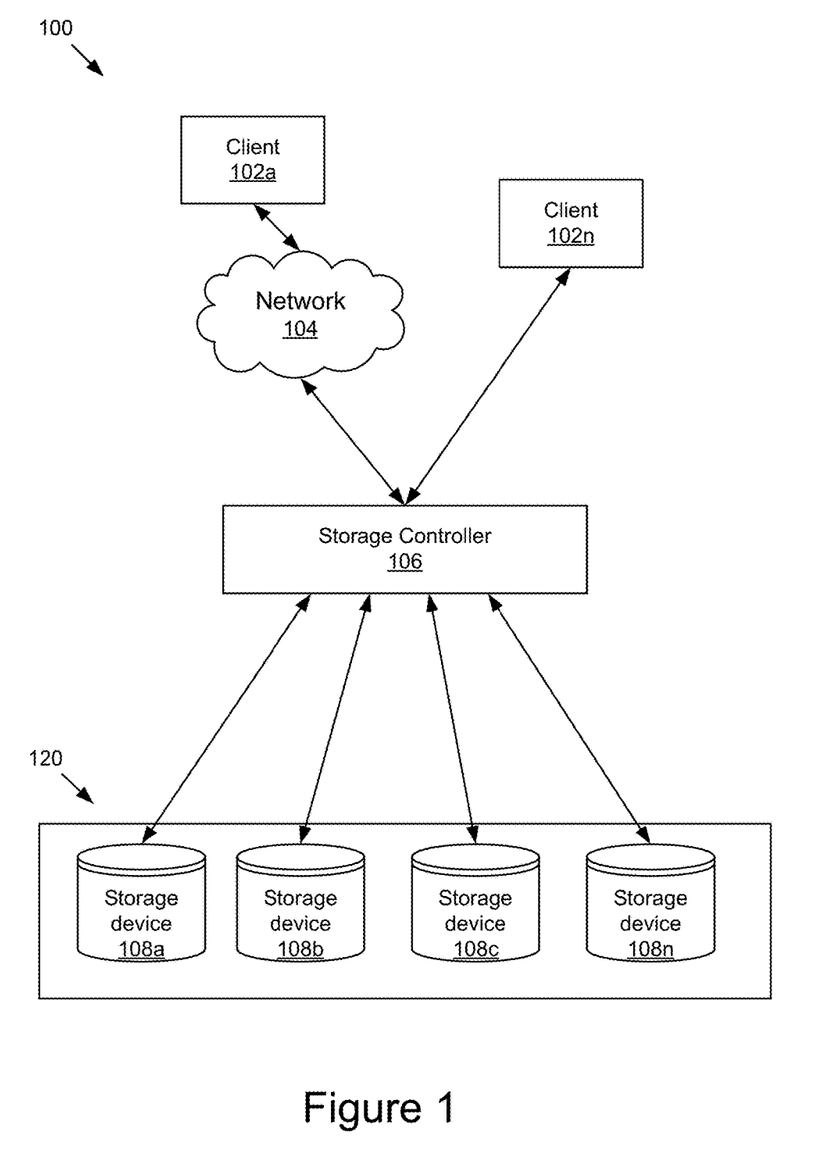
FIG. 1 is a high-level block diagram illustrating an example system including a storage controller and a storage subsystem.

FIG. 1 is a high-level block diagram illustrating an example system 100 including a storage controller 106 and a storage subsystem 120. The system 100 includes one or more client devices 102a . . . 102n, a network 104, and a storage system including storage controller 106 and storage subsystem 120 including storage devices 108a . . . n. The storage devices 108 of storage subsystem 120 may be included in one or more enclosures housed in the same location or physically distributed to disparate locations across a storage area network.

The client devices 102a . . . 102n can be any computing device including one or more memory and one or more processors, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of making storage requests. A client device 102 may execute an application that makes storage requests (e.g., read, write, etc.) to the storage devices 108. While the example of FIG. 1 includes two client devices, 102a and 102n, it should be understood that any number of client devices 102a . . . 102n may be present in the system. Client device (e.g., client device 102a) may be directly coupled with storage sub-systems including individual storage devices (e.g., storage device 108a) via storage controller 106. Optionally, client devices 102 may be indirectly coupled with storage sub-systems including individual storage devices 108 via a separate controller.

In some embodiments, the system 100 includes a storage controller 106 that provides a single interface for the client devices 102 to access the storage devices 112 in the storage system. The storage controller 106 may be a computing device configured to make some or all of the storage space on disks 108 available to client devices 102. As depicted in the example system 100, client devices can be coupled to the storage controller 106 via network 104 (e.g., client device 102a) or directly (e.g., client device 102n).

The network 104 can be one of a conventional type, wired or wireless, and may have numerous different configurations including a star configuration, token ring configuration, or other configurations. Furthermore, the network 104 may include a local area network (LAN), a wide area network (WAN) (e.g., the internet), and/or other interconnected data paths across which multiple devices (e.g., storage controller 106, client device 102, etc.) may communicate. In some embodiments, the network 104 may be a peer-to-peer network. The network 104 may also be coupled with or include portions of a telecommunications network for sending data using a variety of different communication protocols. In some embodiments, the network 104 may include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc.

Although the example of FIG. 1 illustrates one network 104, in practice one or more networks 104 can connect the entities of the system 100.

Figure 2:
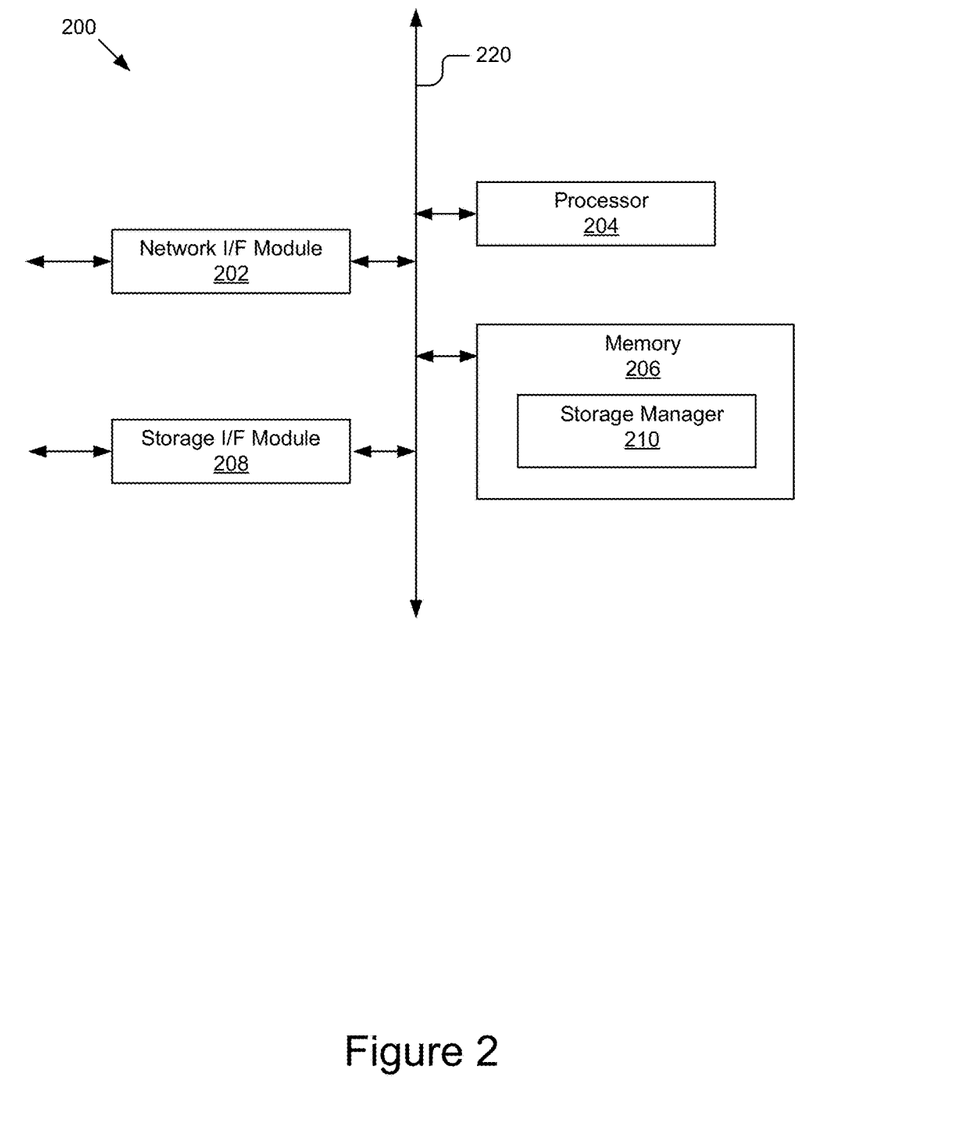
FIG. 2 is a block diagram illustrating an example system configured to implement the techniques introduced herein.

FIG. 2 is a block diagram illustrating an example system 200 configured to implement the techniques introduced herein. In one embodiment, the system 200 may be a client device 102. In other embodiments, the system 200 may be storage controller 106. In yet further embodiments, the system 200 may be implemented as a combination of a client device 102 and storage controller 106.

The system 200 includes a network interface (I/F) module 202, a processor 204, a memory 206 including storage manager 210, and a storage interface (I/F) module 208. The components of the system 200 are communicatively coupled to a bus or software communication mechanism 220 for communication with each other.

In some embodiments, software communication mechanism 220 may be an object bus (e.g., CORBA), direct socket communication (e.g., TCP/IP sockets) among software modules, remote procedure calls, UDP broadcasts and receipts, HTTP connections, function or procedure calls, etc. Further, any or all of the communication could be secure (SSH, HTTPS, etc.). The software communication mechanism 220 can be implemented on any underlying hardware, for example, a network, the Internet, a bus, a combination thereof, etc.

The network interface (I/F) module 202 is configured to connect system 200 to a network and/or other system (e.g., network 104). For example, network interface module 202 may enable communication through one or more of the internet, cable networks, and wired networks. The network interface module 202 links the processor 204 to the network 104 that may in turn be coupled to other processing systems (e.g., storage controller 106 or client device 102). The network interface module 202 also provides other conventional connections to the network 104 for distribution and/or retrieval of files and/or media objects using standard network protocols such as TCP/IP, HTTP, HTTPS and SMTP as will be understood. In some embodiments, the network interface module 202 includes a transceiver for sending and receiving signals using WiFi, Bluetooth®, or cellular communications for wireless communication.

The processor 204 may include an arithmetic logic unit, a microprocessor, a general purpose controller or some other processor array to perform computations and provide electronic display signals to a display device. In some embodiments, the processor 204 is a hardware processor having one or more processing cores. The processor 204 is coupled to the bus 220 for communication with the other components of system 200. Processor 204 processes data signals and may include various computing architectures including a complex instruction set computer (CISC) architecture, a reduced instruction set computer (RISC) architecture, or an architecture implementing a combination of instruction sets. Although only a single processor is shown in the example of FIG. 2, multiple processors and/or processing cores may be included. It should be understood that other processor configurations are possible.

The memory 206 stores instructions and/or data that may be executed by the processor 204. The memory 206 is coupled to the bus 220 for communication with the other components of the system 200. The instructions and/or data stored in the memory 206 may include code for performing any and/or all of the techniques described herein. The memory 206 may be, for example, non-transitory memory such as a dynamic random access memory (DRAM) device, a static random access memory (SRAM) device, flash memory or some other memory devices. In some embodiments, the memory 206 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device.

The storage interface (I/F) module 208 cooperates with storage manager 210 to access information requested by the clients 102. The information may be stored on any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information. However, as illustratively described herein, the information is stored on disks of hard disk drives 108. The storage I/F module 208 includes a plurality of ports having input/output (I/O) interface circuitry that couples with the disks 108 over an I/O interconnect arrangement.

The storage manager 210, stored on memory 206 and configured to be executed by processor 204, facilitates access to data stored on the storage devices 108 (e.g., variable-RPM hard disk drives). In certain embodiments, the storage manager 210 logically organizes data on the storage devices 108 (e.g., the data may be organized as a hierarchical structure of named directories and files on disks). In other embodiments, the storage manager 210 may be configured to monitor the storage devices of the storage subsystem and the intensity of the I/O workload on the system and transition the modes and/or states of the storage devices according to the techniques described herein.

Figure 3A:
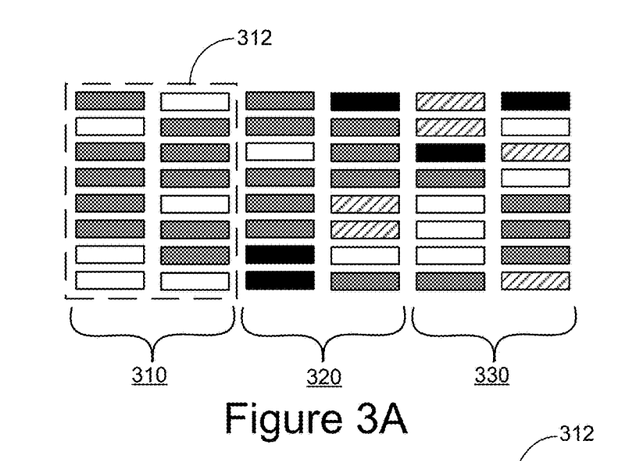
FIGS. 3A, 3B, and 3C are block diagrams illustrating logical views of a storage subsystem, according to the techniques described herein.
Figure 3B:
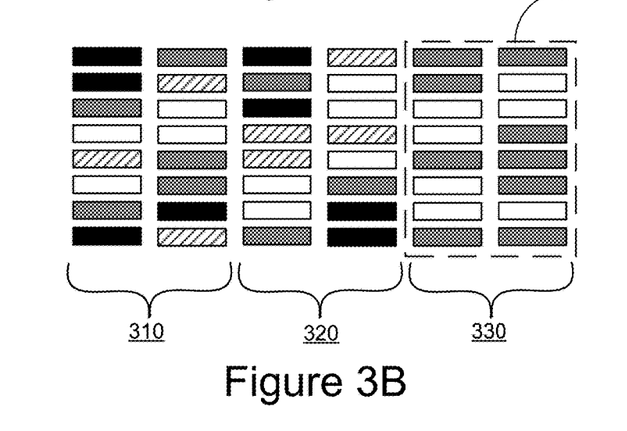
Figure 3C:
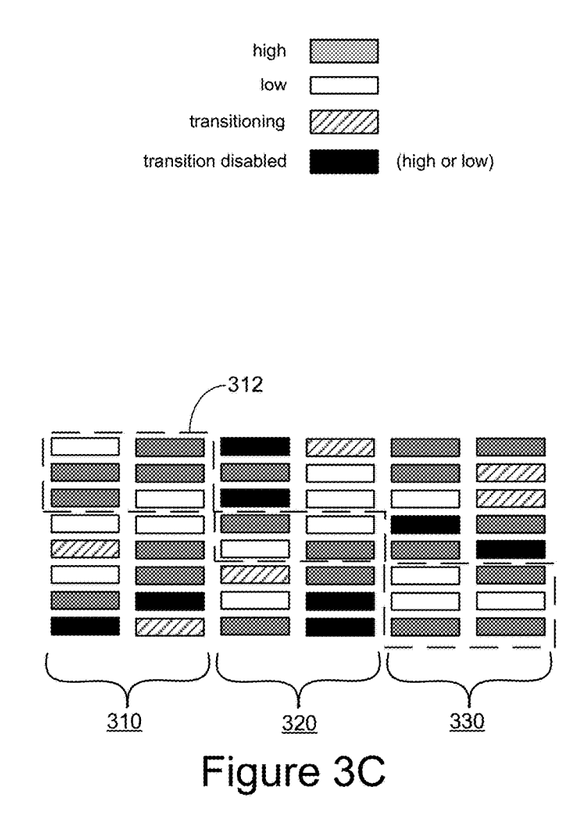

FIGS. 3A, 3B, and 3C illustrate logical views of a storage subsystem according to the techniques described herein. In the example of FIGS. 3A, 3B, and 3C, a storage subsystem (e.g., storage subsystem 120) uses replication for fault tolerance with a replication factor of three. Replication is a form of fault tolerance using redundancy in storage systems whereby data is duplicated over a storage area network and may be accessible in the event of failure of one or more storage devices 108 of storage subsystem 120 or other fault in storage subsystem 120. As an illustration, the storage devices 108 of storage subsystem 120 may be logically organized over the storage area network into three replicas 310, 320, and 330 according to a replication scheme whereby multiple identical instances of data may be replicated across the replicas. In other embodiments, an erasure coding scheme or other replication or redundancy scheme may be employed by storage subsystem 120 as the fault tolerance scheme.

In the example of FIG. 3A, the data stored to storage subsystem 120 is duplicated across replicas 310, 320, and 330. A fixed set of storage devices 312 is chosen based on the fault tolerance scheme deployed to the system, for example, a replication scheme with a replication factor of three. In FIGS. 3A, 3B, and 3C the fixed set 312 is represented by the dashed or dotted lines. As an illustration, in FIG. 3A, the fixed set 312 includes replica 310. The fixed set is configured to include the minimal set of storage devices 108 of the storage subsystem 120 such that all data stored to the storage subsystem is available for I/O requests. The fixed set is designated because the data on the storage devices not included in the fixed set may become unavailable for I/O requests during periods when the devices transition between spin speed modes. During periods when a storage device is transitioning, the storage device is unavailable for read or write operations. For example, using a dual-RPM hard disk drive, data on the storage device may become available for a number of seconds while transitioning takes place. To preclude data unavailability in storage subsystem 120 due to transitioning storage devices 108 of storage subsystem 120, the storage controller 106 is configured to prevent the storage devices of the fixed set 312 from transitioning between operational modes (i.e., remain in a fixed operational mode). For example, the storage controller 106 is configured to prevent storage devices in the fixed set 312, e.g., replica 310, from transitioning between a high RPM operational mode and a low RPM operational mode thereby maintaining full data availability, while the storage controller 106 is configured to allow the remaining storage devices in replica 320 and replica 330 to transition between the operational modes. Furthermore, if a storage device of the remaining storage devices not included in the fixed set fails, the data remains available in the fixed set based on the replication scheme employed by the storage subsystem.

The remaining storage devices not included in the fixed set 312 of storage devices may operate in plurality of states including a high RPM operational mode, a low RPM operational mode, a transitioning state, and a transition disabled state. As an example, a high RPM operational mode includes a storage device mode operating at 7200 RPM or 5400 RPM or other similarly high RPM, and a low RPM operational mode includes a storage device mode operating at 1800 RPM or other similarly low RPM. Storage devices operating in a transitioning state may be transitioning from a high RPM mode to a low RPM mode, or from a low RPM mode to a high RPM mode depending on the needs and/or requirements of the storage subsystem 120 and a data center. Storage devices operating in a transition disabled state are temporarily disabled from transitioning between RPM operational modes. In one embodiment, the system may be configured to determine whether an identified storage device among the remaining storage devices not included in the fixed set has reached a device transition threshold. If the device transition threshold has been reached or exceeded, for example, a total number of transitions of a storage device in a period of time has reached or exceeds 50 transitions, the system may be configured to temporarily disable transitioning of the identified storage device in order to ensure a certain lifetime expectancy of the storage device. In another embodiment, the system may be configured to limit the number of storage devices of the remaining storage devices not included in the fixed set that can transition simultaneously in order to prevent overshooting power usage.

As illustrated in FIGS. 3A, 3B, and 3C, storage devices 108 may be dynamically elected in and out of the fixed set. The storage controller 106 is configured to cycle the fixed set across the entire population of storage devices in the storage subsystem 120 to balance the wear on particular storage devices. The storage controller 106 may be configured to determine whether a fixed set transition threshold has been reached, and in response to determining the fixed set transition threshold has been reached, the storage controller 106 may select another group of storage devices to include in the fixed set 312, as illustrated in FIGS. 3B and 3C. For example, to prevent reliability issues for storage devices 108 due to frequent transitioning, another group of storage devices 108 may be chosen to include in the fixed set. As illustrated in FIG. 3B, the storage controller 106 selects only the storage devices of replica 330 to be included in the fixed set 312. However, as illustrated in FIG. 3C, the storage controller 106 may select storage devices across replicas 310, 320, and 330 to include in the fixed set 312.

In one embodiment, the fixed set transition threshold may be a predetermined amount of time the current fixed set has been in use. Determining whether the fixed set transition threshold has been reached may include tracking the amount of time that has elapsed since the current fixed set was created. In another embodiment, the fixed set transition threshold may be a predetermined number of transitions accumulated by the remaining storage devices in the storage subsystem, e.g., the remaining storage devices 108 in storage subsystem 120 not included in the fixed set. Determining whether the fixed set transition threshold has been reached may include monitoring the number of transitions by the remaining storage devices 108 in the storage subsystem 120 not included in the fixed set. In yet another embodiment, the fixed set transition threshold may be a predetermined number of storage devices of the remaining storage devices in the storage subsystem 120 that have been temporarily disabled from transitioning between operational modes. Determining whether the fixed set transition threshold has been reached may include monitoring the number of storage devices 108 of the remaining storage devices in the storage subsystem 120 that have been temporarily disabled from transitioning.

Figure 4:
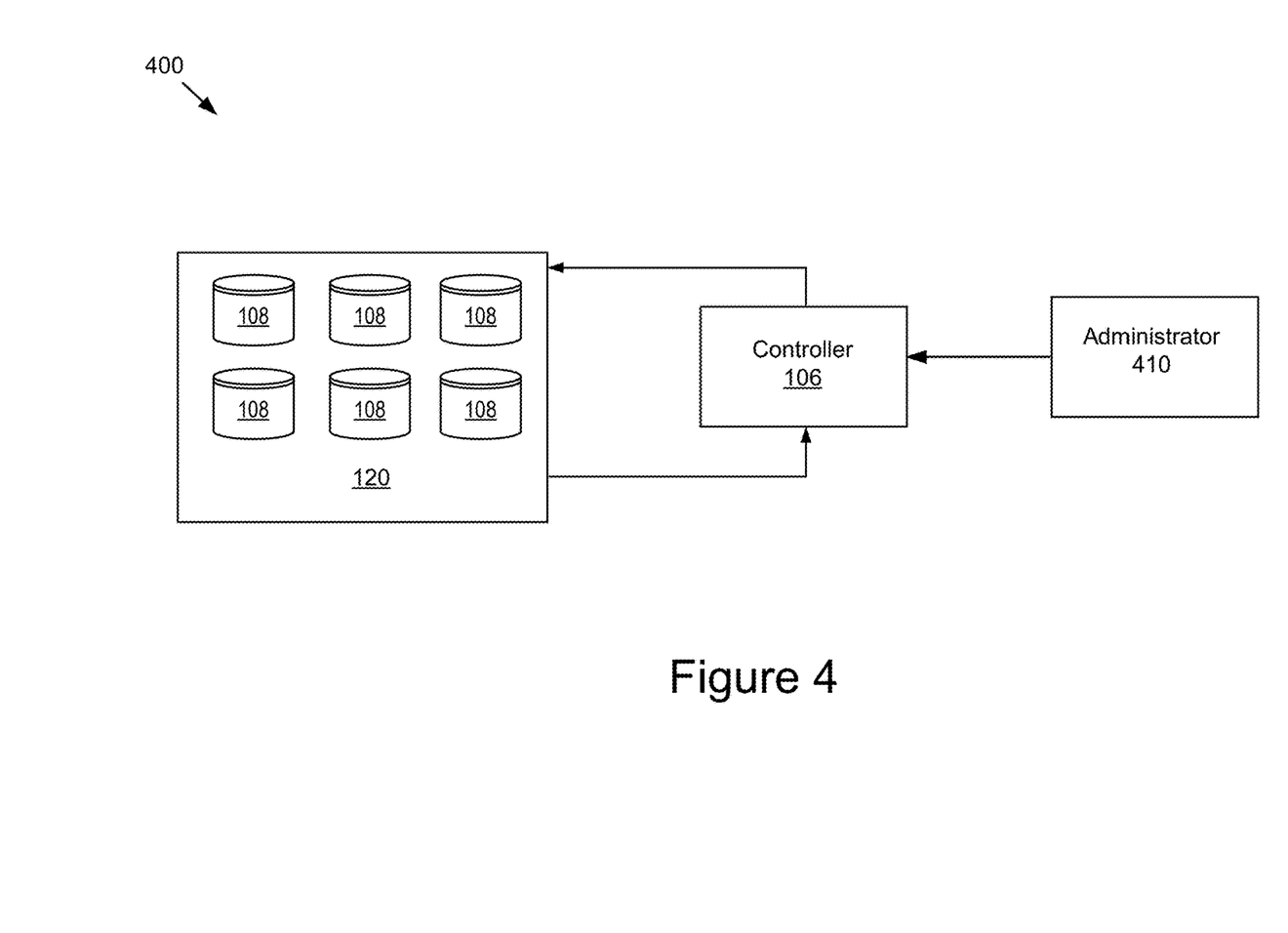
FIG. 4 is a block diagram illustrating an example control and feedback loop architecture of a system including a storage controller and storage subsystem, according to the techniques described herein.

Peak power and energy savings may be accomplished according to the techniques introduced herein. In one embodiment, the storage controller 106 may be configured to allow the remaining storage devices 108 of storage subsystem 120 not included in the fixed set to transition between operational modes. According to this embodiment, the storage controller 106 is configured to monitor the storage devices 108 and the intensity of the I/O workload on the storage subsystem 120. FIG. 4 illustrates a control and/or feedback system 400 used to monitor the storage devices and the I/O workload on the storage subsystem 120. In this embodiment, storage controller 106 accepts inputs from an administrator 410 and storage subsystem 120. As an example, the administrator 410 may set peak power and performance limits of the storage subsystem 120 to prevent violations of power-related agreements or oversubscribing the data center. Further, the output from monitoring the power consumed by storage subsystem 120 and the I/O workload may be fed into storage controller 106 to further control the storage subsystem. In one embodiment, the control and feedback system 400 may be configured to determine an I/O workload of an identified storage device in the remaining storage devices in the storage subsystem not included in the fixed set. According to this embodiment, if storage controller 106 determines that the I/O workload of the identified storage device 108 meets or exceeds a threshold, the operational mode of the identified storage device 108 may be transitioned. For example, the operational mode of the identified storage device 108 may be transitioned from a high RPM mode to a low RPM when it is determined that the I/O workload is less than a predetermined amount. As another example, the operational mode of the identified storage device 108 may be transitioned from a low RPM mode to a high RPM when it is determined that the intensity of the I/O workload will necessitate an increase in operational speed, the data center will not be oversubscribed, and/or no power-related agreements will be violated.

Figure 5:
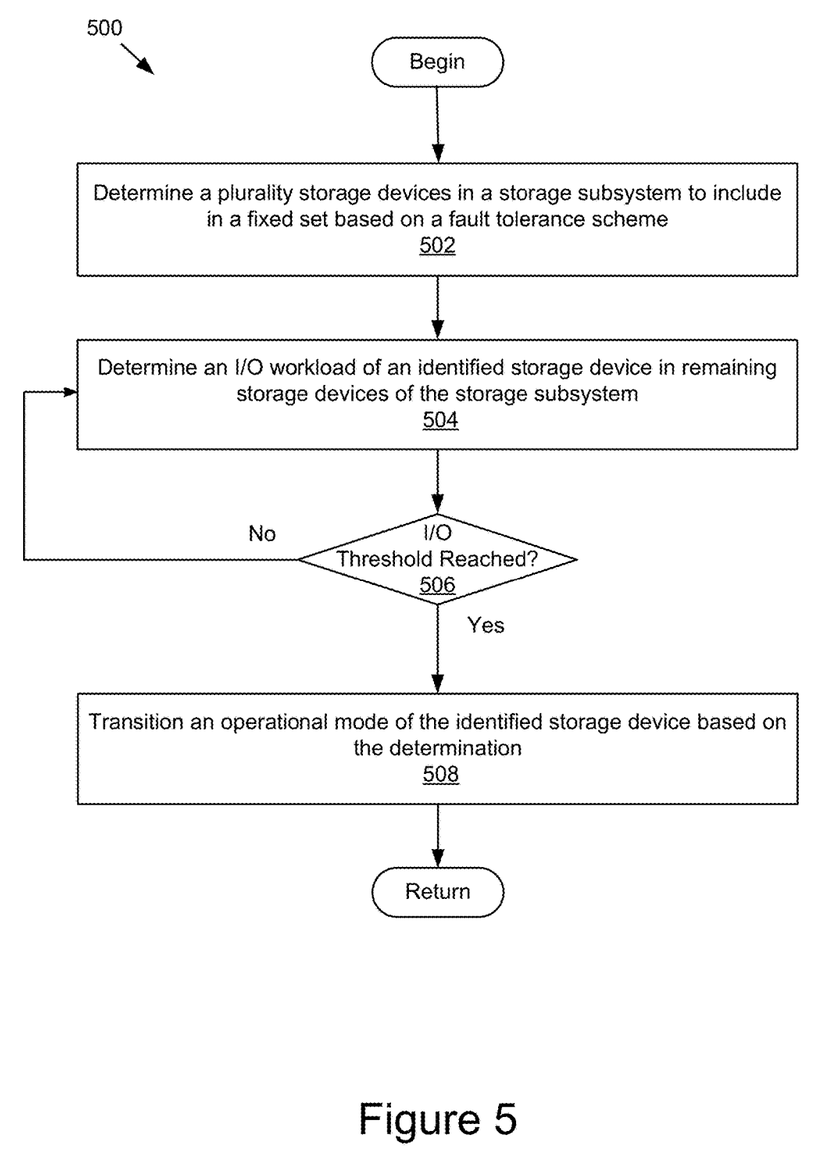
FIG. 5 is a flow chart of an example method for configuring a storage subsystem, according to the techniques described herein.

FIG. 5 is a flow chart of an example method 500 for configuring storage subsystem 120 according to a fault tolerance scheme. At 502, the storage controller 106 determines a plurality of storage devices in a storage subsystem 120 to include in a fixed set based on a fault tolerance scheme. For example, using a replication scheme with a replication factor of three as seen in FIG. 3A the storage controller 106 may determine at 502 that the plurality of storage devices to include in the fixed set 312 should include one entire replica, e.g. replica 310 as seen in FIG. 3A. In this example, replica 310 is at least a minimal set of storage devices needed to restore all of the data stored to storage subsystem 120. The storage controller 106 prevents the storage devices in the fixed set 312, e.g. replica 310 in FIG. 3A, from transitioning between operational modes in order to ensure data availability.

In another embodiment, storage subsystem 120 may be configured using an erasure coding scheme. Similarly, the fixed set in a storage subsystem 120 employing an erasure coding fault tolerance scheme will include at least a minimal set of storage devices 108 needed to restore all the data from storage subsystem 120. The storage devices 108 in the fixed set using the erasure coding scheme, similarly, will remain in either their current low RPM or high RPM mode and thereby maintain data availability, while remaining storage devices in the storage subsystem 120 are configured to transition between operational modes.

During periods of light workload, the storage controller 106 is configured to transition as many storage devices as possible to a low RPM mode to reduce the peak power and energy consumption of the storage subsystem. Conversely, if the workload's intensity increases, the method ramps up as many storage devices as needed to a high RPM mode to satisfy throughput demands. For example, at 504, the storage controller 106 may determine an I/O workload of an identified storage device among the remaining storage devices 108, e.g., in replicas 320 and 330 of FIG. 3A, of the storage subsystem 120 not included in the fixed set 312. At 506, if the storage controller 106 determines that an I/O threshold of the identified storage device has been reached or exceeded, at 508 the storage controller 106 may cause the operational mode of the identified storage device 108 to transition between operational modes, depending on the I/O workload. For example, if the I/O workload is determined to be below a predetermined threshold, at 508 the identified storage device may be transitioned from a high RPM mode to a low RPM mode. As another example, if the I/O workload is determined to be greater than a predetermined threshold, at 508 the identified storage device may be transitioned from a low RPM mode to a high RPM mode. The threshold in these examples may be the same or may be different.

Figure 6:
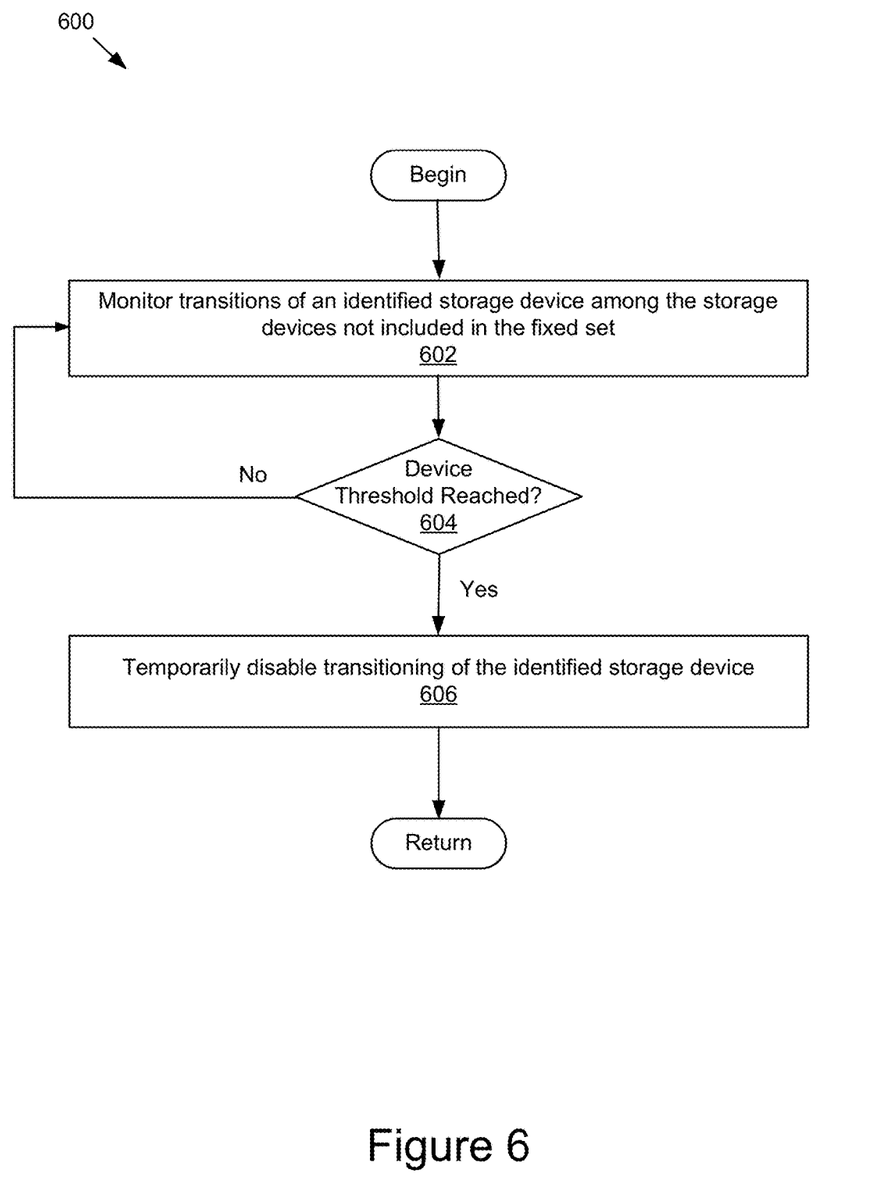
FIG. 6 is a flow chart of an example method for disabling transitions of storage devices between operational modes, according to the techniques described herein.

FIG. 6 is a flow chart of an example method 600 for disabling transitions of storage devices between operational modes, according to techniques described herein. At 602, the storage controller 106 may monitor the storage devices 108 not included in the fixed set and their transitions. For example, at 602, storage controller 106 may monitor the mode transitions of an identified storage device. If at 604 the storage controller 106 determines that the identified storage device has reached or exceeded a storage device transition threshold, the storage controller 106 may be configured to temporarily disable transitioning of the identified storage device. If transitioning of a storage device is temporarily disabled, the storage controller 106 will prevent the storage device from transitioning between operational modes. However, the storage device will be frozen in its current operational mode and still available for I/O requests.

Figure 7:
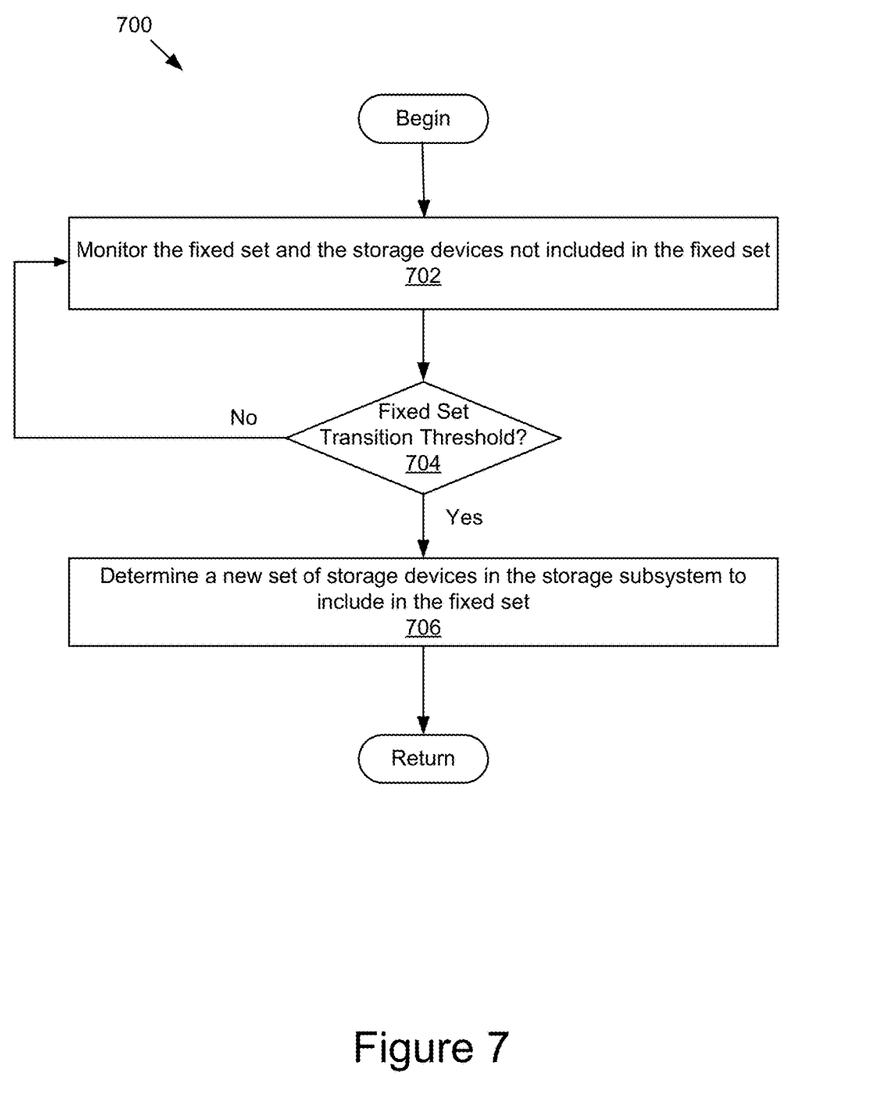
FIG. 7 is a flow chart of an example method for managing the fixed set of storage devices in a storage subsystem, according to the techniques described herein.

FIG. 7 is a flow chart of an example method 700 for managing the fixed set of storage devices in storage subsystem 120, according to techniques described herein. At 702, the storage controller 106 may monitor the storage devices 108 of the fixed set and the remaining storage devices 108 not included in the fixed set and their transitions. At 704, if the storage controller 106 determines a fixed set transition threshold has been reached, the storage controller 106 may determine a new set of storage devices 108 in storage subsystem 120 to include in the fixed set at 706. In one embodiment, the storage controller 106 may determine a specified amount of time has elapsed since the first fixed set was created in order to determine a fixed set transition threshold has been reached. In another embodiment, the storage controller 106 may determine a selected number of transitions by the remaining storage devices 108 not included in the fixed set has accumulated in order to determine a fixed set transition threshold has been reached. In yet another embodiment, the storage controller 106 may determine a selected number of storage devices 108 of the remaining storage devices in the storage subsystem have been temporarily disabled from transitioning in order to determine a fixed set transition threshold has been reached. In response to determining the fixed set transition threshold has been reached, the storage controller 120 may determine a new set of storage devices in the storage subsystem to include in the fixed set. For example, the storage controller 106 may determine that the storage devices not included in the fixed set have reached a limit to the number of transitions before becoming unreliable. The storage controller 106 may track the aggregate number of storage devices among the storage devices not included in the fixed set that have been temporarily disabled or locked from transitioning. These storage devices may be transition disabled to preserve the lifespan of each device. Furthermore, if the storage controller 106 determines that the aggregate number of storage devices that have been temporarily disabled from transitioning has reached a specified number, the storage controller 106 may elect a new fixed set, allowing the storage devices of the new fixed set to rest from transitioning. The storage controller 106 may elect a completely new replica as the new fixed set as seen in FIG. 3B. On the other hand, the storage controller 106 may determine a new set to include in the fixed based on the storage devices that were previously locked from transitioning.

Figure 8:
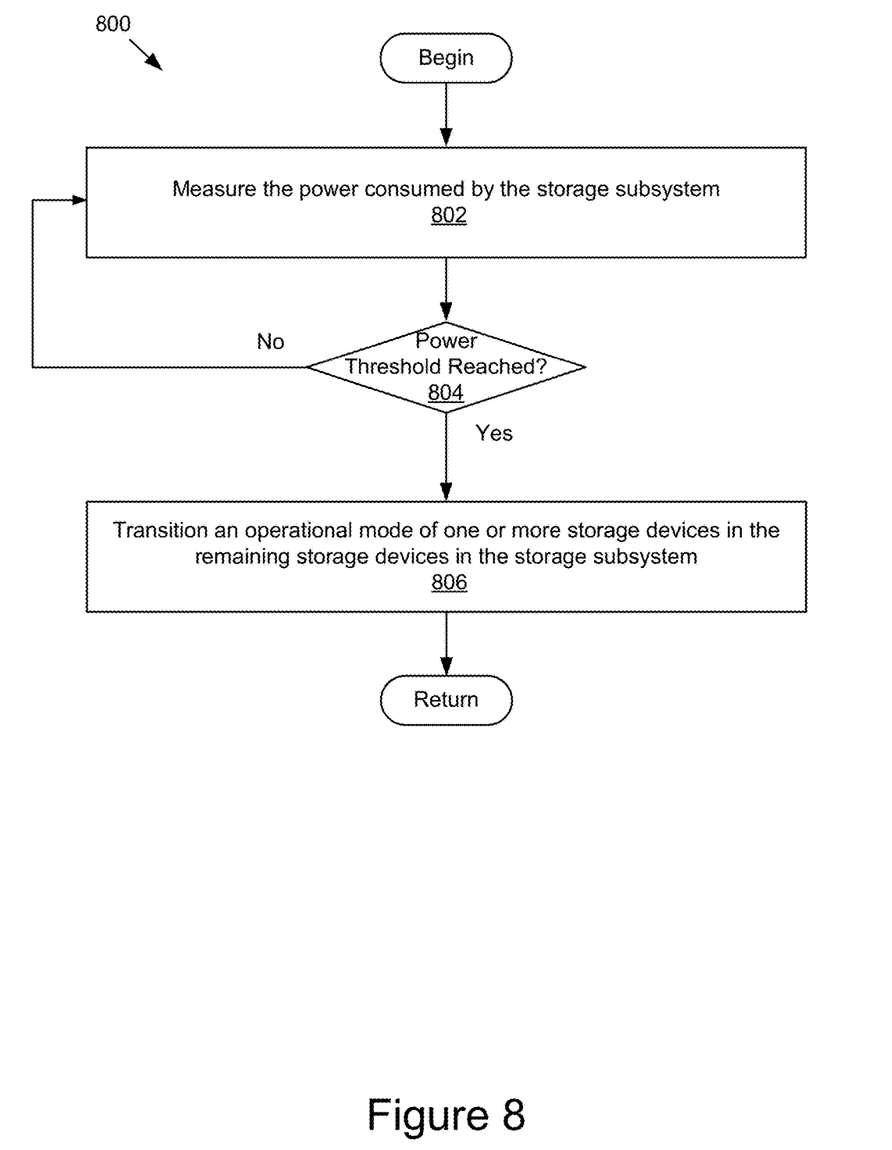
FIG. 8 is a flow chart of an example method for controlling the power consumption of a storage subsystem.

Similar to the scenario described above with reference to FIG. 5, where the storage controller 106 may transition storage devices based on an I/O threshold, the storage controller may transition storage devices based on the overall power consumption of the storage subsystem 120. For example, the data center where the storage subsystem 120 resides may have a power limit based on the service provided by the local power company or on-site energy production. The storage controller 106 may be programmed to minimize the power consumption by adjusting a fraction of the storage devices operating in a high RPM mode. FIG. 8 is a flow chart of an example method 800 for controlling the power consumption of the storage subsystem 120. At 802, the storage controller 106 may measure the power consumed the storage subsystem 120. For example, the storage controller 106 may monitor the power consumed by individual storage devices in the storage subsystem 120 and aggregate the individual power consumption levels into a total for the storage subsystem 120. Similarly, the storage controller may monitor the power consumed by the storage subsystem 120 as a whole at a point where the electrical service is provided to the storage subsystem 120. At 804, if the storage controller 106 determines that the power consumption of the storage subsystem 220 has reached a power threshold, the storage controller, at 806, causes one or more the storage devices in the storage subsystem (e.g., storage devices not included in the fixed set) to transition between operational modes depending on the power consumption. For example, if the power consumption of the storage subsystem 120 increases beyond the power threshold of the data center, an appropriate number of storage devices may be transitioned to a low power operational mode to bring the data center into compliance with the power limit.

Systems and methods for controlling a system of storage devices are described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some embodiments above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one embodiment" or "an embodiment" means that a particular feature, structure, or characteristic described in connection with the embodiment is included in at least one embodiment of the disclosed technologies. The appearances of the phrase "in one embodiment" in various places in the specification are not necessarily all referring to the same embodiment.

Some portions of the detailed descriptions above may be presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware embodiment, an entirely software embodiment or an embodiment containing both hardware and software elements. In some embodiments, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the embodiments of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to embodiment in any specific programming language, or for any specific operating system or environment. Accordingly, the disclosure of the present techniques and technologies is intended to be illustrative, but not limiting.

What is claimed is:

1. A system comprising:
   one or more processors; and
   a memory storing instructions that, when executed, cause the one or more processors to:
      determine two or more storage groups of a storage subsystem, each storage group from the two or more storage groups comprising a plurality of storage devices;
      determine a first plurality of storage devices from among the storage devices of the two or more storage groups to include in a fixed set based on a fault tolerance scheme such that all storage devices in the fixed set are available for input/output (I/O) requests, the fixed set comprising a subset of the storage subsystem having information sufficient to restore all data stored in the storage subsystem without requiring data from remaining storage devices in the storage subsystem not included in the fixed set, wherein the instructions cause the one or more processors to prevent all storage devices of the fixed set from transitioning between operational modes;
      determine an I/O workload of an identified storage device in the remaining storage devices in the storage subsystem not included in the fixed set;
      determine whether the I/O workload meets a threshold; and
      responsive to determining the threshold has been met, transition an operational mode of the identified storage device.

2. The system of claim 1, wherein the operational mode of the identified storage device is one of a low revolutions per minute (RPM) spin speed mode or a high RPM spin speed mode.

3. The system of claim 1, wherein the fault tolerance scheme comprises one of replication or erasure coding.

4. The system of claim 1, wherein the instructions further cause the one or more processors to:
   measure power consumed by the storage subsystem;
   determine whether the power consumed by the storage subsystem reaches a power threshold; and
   responsive to determining that the power threshold has been reached, transition an operational mode of a storage device in the remaining storage devices in the storage subsystem not included in the fixed set.

5. The system of claim 1, wherein the instructions further cause the one or more processors to:
   determine whether the identified storage device has reached a device transition threshold; and
   responsive to determining the device transition threshold has been reached, temporarily disable transitioning of the identified storage device.

6. The system of claim 5, wherein the instructions further cause the one or more processors to:

determine whether a fixed set transition threshold has been reached; and responsive to determining the fixed set transition threshold has been reached, determine a second plurality of storage devices in the storage subsystem to include in the fixed set.

7. The system of claim 6, wherein to determine whether the fixed set transition threshold has been reached, the instructions cause the one or more processors to determine whether a specified amount of time has elapsed since the first plurality of storage devices were included in the fixed set.

8. The system of claim 6, wherein to determine whether the fixed set transition threshold has been reached, the instructions cause the one or more processors to determine whether a specified number of transitions by the remaining storage devices in the storage subsystem not included in the fixed set has accumulated.

9. The system of claim 6, wherein to determine whether the fixed set transition threshold has been reached, the instructions cause the one or more processors to determine whether a specified number of storage devices of the remaining storage devices in the storage subsystem not included in the fixed set have been temporarily disabled.

10. A computer-implemented method comprising:

determining two or more storage groups of a storage subsystem, each storage group from the two or more storage groups comprising a plurality of storage devices;

determining a first plurality of storage devices from among the storage devices of the two or more storage groups to include in a fixed set based on a fault tolerance scheme such that all storage devices in the fixed set are available for input/output (I/O) requests, the fixed set comprising a subset of the storage subsystem having information sufficient to restore all data stored in the storage subsystem without requiring data from remaining storage devices in the storage subsystem not included in the fixed set;

preventing all storage devices of the fixed set from transitioning between operational modes;

determining an I/O workload of an identified storage device in the remaining storage devices in the storage subsystem not in the fixed set;

determining whether the I/O workload satisfies a threshold; and responsive to determining the threshold has been satisfied, transitioning an operational mode of the identified storage device.

11. The method of claim 10, wherein the operational mode of the identified storage device is one of a low revolutions per minute (RPM) spin speed mode or a high RPM spin speed mode.

12. The method of claim 10, further comprising:

measuring power consumed by the storage subsystem;

determining whether the power consumed by the storage subsystem reaches a power threshold; and responsive to determining that the power threshold has been reached, transitioning an operational mode of a storage device in the remaining storage devices in the storage subsystem not included in the fixed set.

13. The method of claim 10, further comprising:

determining whether the identified storage device has reached a device transition threshold; and responsive to determining the device transition threshold has been reached, temporarily disabling transitioning of the identified storage device.

14. The method of claim 13, further comprising:

determining whether a fixed set transition threshold has been reached; and responsive to determining the fixed set transition threshold has been reached, determining a second plurality of storage devices in the storage subsystem to include in the fixed set.

15. The method of claim 14, wherein determining the fixed set transition threshold has been reached comprises determining whether a specified amount of time has elapsed since the first plurality of storage devices were included in the fixed set.

16. The method of claim 14, wherein determining the fixed set transition threshold has been reached comprises determining whether a specified number of transitions by the remaining storage devices in the storage subsystem not included in the fixed set has accumulated.

17. The method of claim 14, wherein determining the fixed set transition threshold has been reached comprises determining whether a specified number of storage devices of the remaining storage devices in the storage subsystem not included in the fixed set have been temporarily disabled.

18. A computer program product comprising a non-transitory computer useable medium including a computer readable program, wherein the computer readable program when executed on a computer causes the computer to:

determine two or more storage groups of a storage subsystem, each storage group from the two or more storage groups comprising a plurality of storage devices;

determine a first plurality of storage devices from among the storage devices of the two or more storage groups to include in a fixed set based on a fault tolerance scheme such that all storage devices in the fixed set are available for input/output (I/O) requests, the fixed set comprising a subset of the storage subsystem having information sufficient to restore all data stored in the storage subsystem without requiring data from remaining storage devices in the storage subsystem not included in the fixed set, wherein the computer readable program causes the computer to prevent all storage devices of the fixed set from transitioning between a high revolutions per minute (RPM) operational mode and a low RPM operational mode and to allow remaining storage devices in the storage subsystem to transition between the high RPM operational mode and the low RPM operational mode;

determine an I/O workload of an identified storage device in the remaining storage devices in the storage subsystem;

determine whether the I/O workload meets a threshold; and responsive to determining the threshold has been met, transition an operational mode of the identified storage device from the high RPM operational mode to the low RPM operational mode.

19. The computer program product of claim 18, wherein the fault tolerance scheme comprises one of replication or erasure coding.

20. The computer program product of claim 18, wherein the computer readable program further causes the computer to:

measure power consumed by the storage subsystem;

determine whether the power consumed by the storage subsystem reaches a power threshold; and responsive to determining that the power threshold has been reached, transition an operational mode of one or more storage devices in the remaining storage devices in the storage subsystem not included in the fixed set.

21. The computer program product of claim 18, wherein the computer readable program further causes the computer to:

determine whether the identified storage device has reached a device transition threshold; and     responsive to determining the device transition threshold has been reached, temporarily disable transitioning of the identified storage device.

22. The computer program product of claim 21, wherein the computer readable program further causes the computer to:

determine whether a fixed set transition threshold has been reached; and     responsive to determining the fixed set transition threshold has been reached, determine a second plurality of storage devices in the storage subsystem to include in the fixed set.

23. The computer program product of claim 22, wherein the fixed set transition threshold is a specified amount of time the first plurality of storage devices were included in the fixed set.

24. The computer program product of claim 22, wherein the fixed set transition threshold is a specified number of transitions accumulated by the remaining storage devices in the storage subsystem not included in the fixed set.

25. The computer program product of claim 22, wherein the fixed set transition threshold is a specified number of storage devices that have been temporarily disabled of the remaining storage devices in the storage subsystem not included in the fixed set.

\* \* \* \* \*